United States Patent
Lenhart, Jr. et al.

(10) Patent No.: US 7,420,140 B2
(45) Date of Patent: Sep. 2, 2008

(54) METHOD AND APPARATUS FOR CONTROLLING THE ENERGIZATION OF A COOKING APPLIANCE

(75) Inventors: Brian P. Lenhart, Jr., Louisville, KY (US); Philip A. Barber, Louisville, KY (US); Gregory M. Thomas, Louisville, KY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/480,021

(22) Filed: Jun. 30, 2006

(65) Prior Publication Data

US 2008/0011736 A1    Jan. 17, 2008

(51) Int. Cl.
*H05B 1/02*   (2006.01)
*A21B 1/40*   (2006.01)
*F27D 19/00*  (2006.01)

(52) U.S. Cl. .................. 219/412; 219/394; 219/486
(58) Field of Classification Search ........................ None
See application file for complete search history.

(56) References Cited

U.S. PATENT DOCUMENTS

| | | | |
|---|---|---|---|
| 4,242,554 A * | 12/1980 | Hurko et al. ............... | 219/685 |
| 4,307,659 A | 12/1981 | Martin et al. | |
| 4,355,570 A | 10/1982 | Martin et al. | |
| 4,775,777 A | 10/1988 | Sinn | |
| 4,852,544 A | 8/1989 | Williams et al. | |
| 5,485,780 A | 1/1996 | Koether et al. | |
| 5,618,460 A | 4/1997 | Fowler et al. | |
| 5,767,488 A | 6/1998 | Barger et al. | |
| 5,841,204 A | 11/1998 | English | |
| 5,990,460 A | 11/1999 | Petty et al. | |
| 6,114,664 A | 9/2000 | Cook et al. | |
| 6,157,008 A * | 12/2000 | Brown et al. ................ | 219/486 |
| 6,166,353 A * | 12/2000 | Senneville et al. .......... | 219/385 |
| 6,222,163 B1 | 4/2001 | Arntz et al. | |
| 6,291,808 B1 | 9/2001 | Brown | |
| 6,566,638 B2 | 5/2003 | Brown | |
| 7,081,601 B2 | 7/2006 | Boyer et al. | |
| 7,193,185 B2 * | 3/2007 | Fisher ........................ | 219/394 |

* cited by examiner

*Primary Examiner*—J. Pelham
(74) *Attorney, Agent, or Firm*—George L. Rideout, Esq.; Armstrong Teasdale LLP (57) ABSTRACT

A control system for an oven includes a first and a second temperature sensor, and a controller. The oven has a first cavity and a second cavity and includes, a first electrical heating element positioned within the first oven cavity, and a second electrical heating element positioned within the second oven cavity. The first temperature sensor is configured to detect a temperature within the first oven cavity, and the second temperature sensor is configured to detect a temperature within the second oven cavity. The controller is operatively coupled to the temperature sensors and the heating elements. The controller is configured to receive signals from the sensors and energize both the first and second heating elements by allowing energy to be supplied to only one of the first and second heating elements at a given time.

24 Claims, 7 Drawing Sheets

METHOD AND APPARATUS FOR CONTROLLING THE ENERGIZATION OF A COOKING APPLIANCE

BACKGROUND OF THE INVENTION

This invention relates generally to cooking appliances and, more particularly, to methods and apparatus for heating a cooking appliance.

At least one known oven includes an oven cavity, and a drawer beneath the oven cavity which may be utilized to store various articles, such as food therein. The food needs to be maintained above a specific temperature in the drawer. A plurality of known heating elements may be utilized to respectively heat the oven cavity and the drawer. At least some known heating elements work on a 120 volt electrical power supply. As such, the oven is provided with a 240 volt power supply for substantially simultaneously heating both the oven cavity and the drawer. Accordingly, home kitchens in which the oven is to be installed have to be wired with a 240 volt power supply.

If a consumer has a previous oven that is either gas or has a 120 volt power supply, the kitchen may have to be rewired to accommodate a 240 volt appliance.

Accordingly, a new circuit breaker, upgraded electrical wiring, and an outlet configured to deliver 240 volts to the electric appliance may have to be wired into the house. Such rewiring undesirably increases the costs to the consumer, and discourages some consumers from selecting such an electric oven.

BRIEF DESCRIPTION OF THE INVENTION

In one aspect, a control system for an oven having a first oven cavity and a second cavity is provided. The oven includes at least one first electrical heating element positioned within the first oven cavity, and a second electrical heating element positioned within the second oven cavity. The control system includes a first temperature sensor configured to detect a temperature within the first oven cavity, a second temperature sensor configured to detect a temperature within the second oven cavity, and a controller operatively coupled to the temperature sensors and the heating elements. The controller is configured to receive signals from the sensors and energize both the first and second heating elements by allowing energy to be supplied to only one of the first and second heating elements at a given time.

In another aspect, an oven having a first cavity and a second cavity is provided. The oven includes at least one first electrical heating element positioned within the first cavity, and a first temperature sensor configured to detect a temperature within the first cavity. The oven also includes a second electrical heating element positioned within the second cavity, a second temperature sensor configured to detect a temperature within the second cavity, and a controller operatively coupled to the temperature sensors and the heating elements. The controller is configured to exclusively energize one of the first heating element and the second heating element at a given time.

In still another aspect, a method for providing an oven having a first cavity and second cavity is provided. The method includes positioning a plurality of first electrical heating elements within the first cavity, and providing a first temperature sensor configured to detect a temperature within the first cavity. The method also includes positioning at least one second electrical heating element within the second cavity, providing a second temperature sensor configured to detect a temperature within the second cavity, and operatively coupling a controller to the temperature sensors and the heating elements. The controller is configured to exclusively energize one of the first heating elements and the second heating element at a given time.

DETAILED DESCRIPTION OF THE INVENTION

Figure 1:
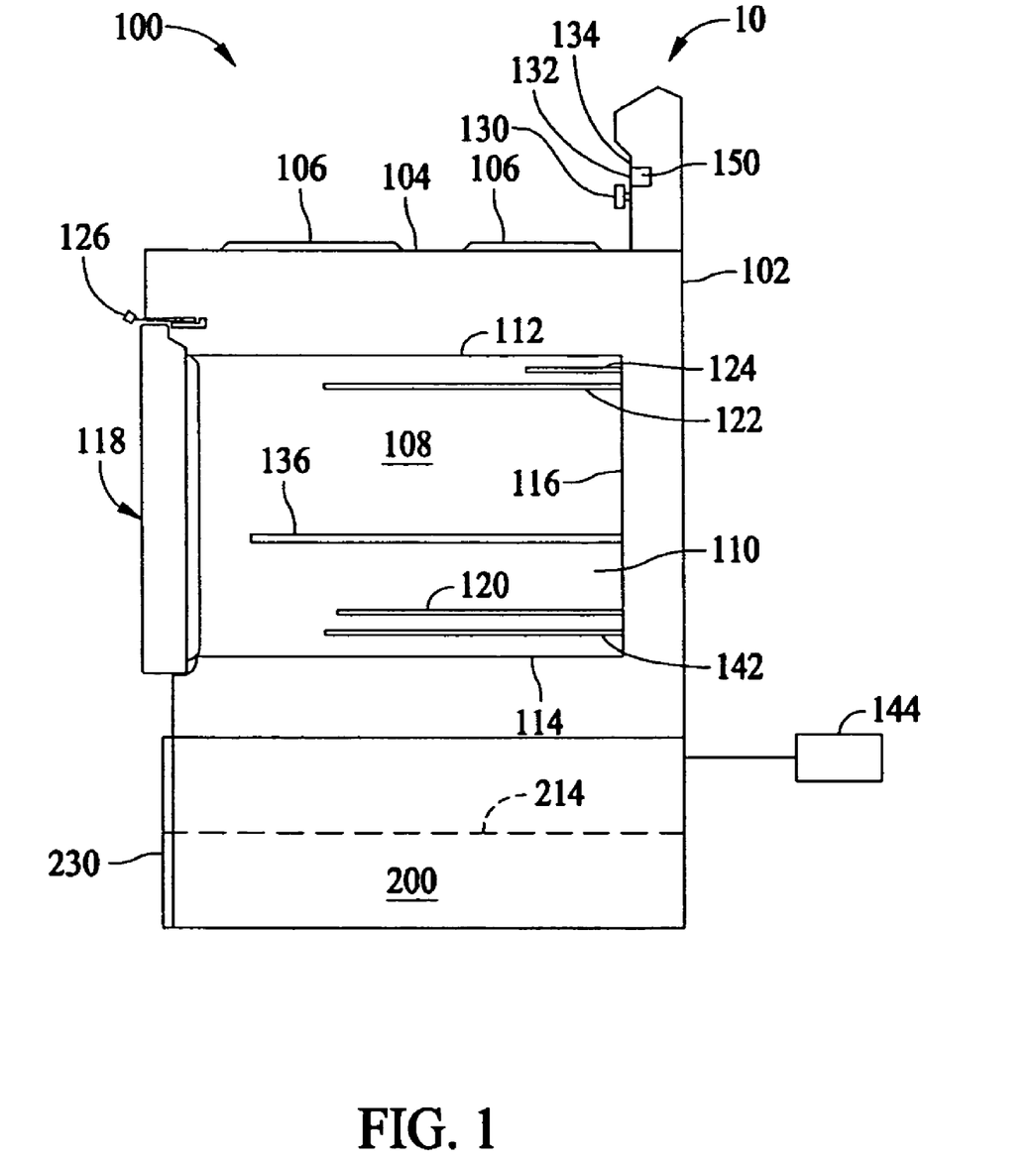
FIG. 1 is a side view of an exemplary oven assembly.

FIG. 1 is an exemplary embodiment of an oven assembly 10 that includes a self-cleaning cooking platform 100 and a second warming platform 200. While a free standing electric range is shown, it is to be understood that the method and/or apparatus described herein are suitable for use with other self-cleaning oven products and/or non-self-cleaning oven products, such as a wall oven, a gas oven, a speedcooking oven and a dual fuel oven.

Oven platform 100 includes an outer cabinet 102 and a top cooking surface 104 having a plurality of individual surface heating elements 106. Positioned within cabinet 102 is a cooking chamber or first oven cavity 108 formed by a box-like oven liner having at least two vertical side walls 110, a top wall 112, a bottom wall 114, a rear wall 116, and a front opening drop door 118. First oven cavity 108 is provided with at least one electrical heating element. In one embodiment, a bake heating element 120 is positioned adjacent bottom wall 114 and a broil heating element 122 is positioned adjacent top wall 112.

A temperature sensor or probe, such as an air temperature sensor and/or a contact temperature sensor, is positioned within first oven cavity 108 to sense and/or monitor a temperature within first oven cavity 108. In one embodiment, a first temperature probe or sensor 124 is mounted at least partially within cooking chamber 108 and senses an air temperature within first oven cavity 108. In an alternative embodiment, sensor 124 is a contact temperature sensor coupled to one of walls 110, 112, 114, and 116 for sensing a temperature within first oven cavity 108. In a particular embodiment, cooking platform 100 also includes a reflector (not shown) mounted on top wall 112 or bottom wall 114, and contact temperature sensor 124 is coupled to the reflector for sensing a temperature thereof.

A door latch handle 126 is used for locking door 118 in a closed position during a self-cleaning operation. A control knob 130 extends outwardly from a control panel 132, which is supported from a back splash 134 of oven assembly 10. Control panel 132 includes a plurality of input selectors (not shown) cooperating with control knob 130 to form a user interface for selecting cooking cycles, warming cycles and/or other operating features. Control panel 132 includes a display section (not shown) that indicates selected cycles and/or operating features, as well as other suitable items of interest to users. In the exemplary embodiment, cooking platform 100 also includes at least one cooking rack 136 positioned within first oven cavity 108.

In the exemplary embodiment, cooking platform 100 includes a lower gas burner 142, i.e. a bake burner, positioned at a lower portion of first oven cavity 108. In an alternative embodiment, cooking platform 100 includes an upper gas broil burner in addition to or instead of lower gas burner 142. In a further alternative embodiment, cooking platform 100 includes electrical heating element 120 or electrical heating element 122.

In the exemplary embodiment, oven assembly 10 includes a second warming platform 200 coupled to and positioned beneath self-cleaning cooking platform 100. Oven assembly 10 also includes a 120 volt, 15 ampere circuit 144 electrically connected with cooking platform 100 and warming platform 200 for supplying energy thereto. As such, oven assembly 10 uses a standard 120 volt household power supply (not shown).

Operation of cooking platform 100 and warming platform 200 are controlled by a main controller 150 operatively coupled to the user interface input located on control panel 132 for user manipulation to select cooking cycles, warming cycles and/or other operating features. In response to user manipulation of the user interface input, main controller 150 operates the various components of oven assembly 10 to execute selected cooking cycles, warming cycles and/or operating features.

Figure 2:
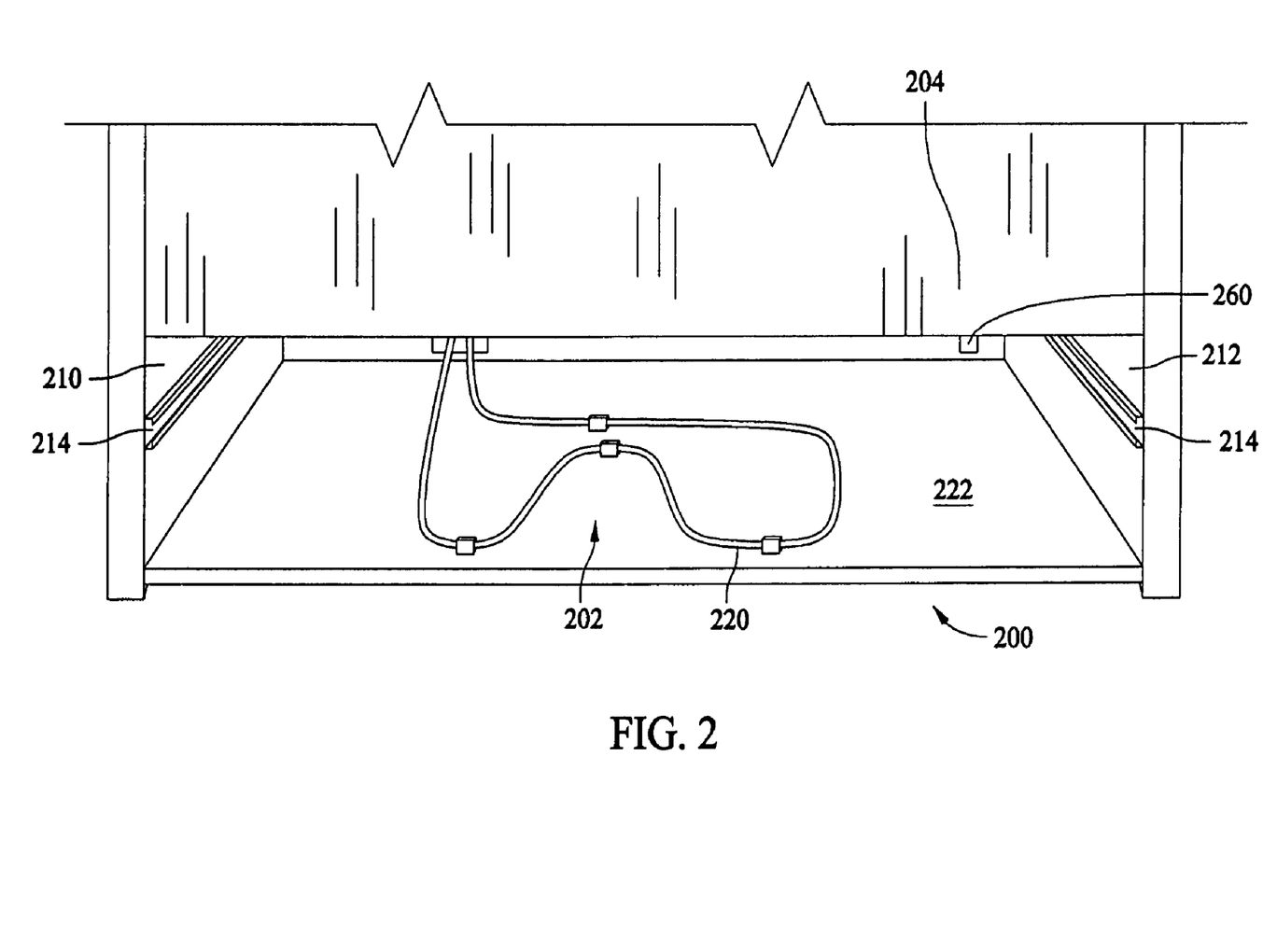
FIG. 2 is a front perspective view of an exemplary warming platform that can be used with the oven assembly shown in FIG. 1.
Figure 3:
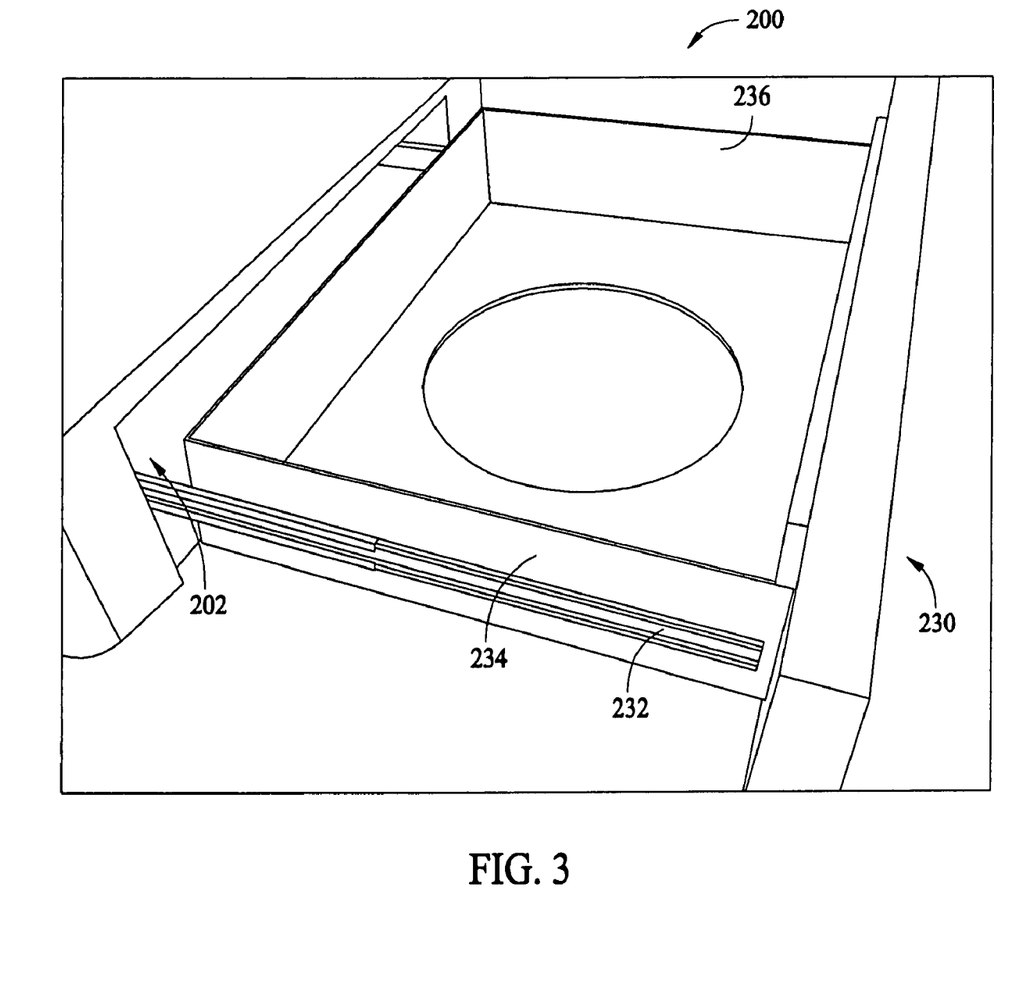
FIG. 3 is a side perspective view of an exemplary warming platform having a drawer positioned within a second oven cavity of the oven assembly shown in FIG. 2.

Referring to FIGS. 2 and 3, an exemplary warming platform 200 for use with oven assembly 10 (shown in FIG. 1) is provided. Warming platform 200 is configured to receive suitable items, such as food items, therein and maintain the items at or above a desired temperature.

As shown in FIG. 2, warming platform 200 includes a warming chamber or second oven cavity 202 defined within an oven liner 204 having first wall 210 and opposing second wall 212. First and second walls 210 and 212 at least partially define second oven cavity 202. A slide rail 214 is coupled to each of first wall 210 and second wall 212. An electrical heating element 220 is positioned within second oven cavity 202 for warming second oven cavity 202. In a particular embodiment, electrical heating element 220 is coupled to a bottom wall 222 partially defining second oven cavity 202. In one embodiment, heating element 220 is controlled by a thermistor and electrically coupled to controller 150. In this embodiment, heating element 220 is utilized as a warming element. In an alternative embodiment, warming platform 200 includes an upper electrical baking and/or broiling element.

As shown in FIG. 3, a drawer 230 is slidably coupled to each slide rail 214 by slides 232 coupled to each of a first side wall 234 and an opposing second side wall 236 of drawer 230. In the exemplary embodiment, drawer 230 is a one-piece deep drawn style, which permits drawer 230 to be heated to a high temperature without deforming. Drawer 230 is positioned within second oven cavity 202, and has an exterior surface coated with a pyrolitic enamel material. Food is positionable within drawer 230 and heated to a desired temperature.

A drawer front 240 is coupled to drawer 230, such that drawer 230 can slide out from second oven cavity 202 by pulling drawer front 240. When drawer 230 slides into second oven cavity 202, a gasket is positioned about second oven cavity 202 for facilitating sealing contact between drawer front 240 and oven liner 204 defining second oven cavity 202 to retain heat within second oven cavity 202. A temperature sensor, such as an air temperature sensor and/or a contact temperature sensor, is positioned within second oven cavity 202 to sense and/or monitor a temperature within second oven cavity 202. In one embodiment, a contact temperature sensor 260 is coupled within second oven cavity 202 for sensing a temperature within second oven cavity 202. In a particular embodiment, contact temperature sensor 260 is coupled to a reflector (not shown) for detecting the temperature thereof. In an alternative embodiment, an air temperature sensor is at least partially positioned within second oven cavity 202 for sensing an air temperature therein.

As shown in FIG. 3, drawer 230 is a one-piece deep drawn style drawer. In alternative embodiments, drawer 230 includes a removable portion, such as a removable bottom portion. In such embodiments, the removable bottom portion is removed from second oven cavity 202 to facilitate cleaning the removable bottom portion.

In an alternative embodiment, an exemplary baking platform 250 for use with oven assembly 10 (shown in FIG. 1) is provided. Baking platform 250 is configured to receive suitable items, such as food items, therein and maintain the items at or above a desired temperature.

As shown in FIG. 2, baking platform 250 includes second oven cavity 202 defined within oven liner 204 having first wall 210 and opposing second wall 212. First and second walls 210 and 212 at least partially define second oven cavity 202. Slide rail 214 is coupled to each of first wall 210 and second wall 212. Electrical heating element 220 is positioned within second oven cavity 202 for warming second oven cavity 202. In a particular embodiment, electrical heating element 220 is coupled to bottom wall 222 partially defining second oven cavity 202. In one embodiment, heating element 220 is controlled by a thermistor and electrically coupled to controller 150. In this embodiment, heating element 220 is utilized as a baking element. In an alternative embodiment, baking platform 250 includes an upper electrical baking and/or broiling element 254.

Figure 4:
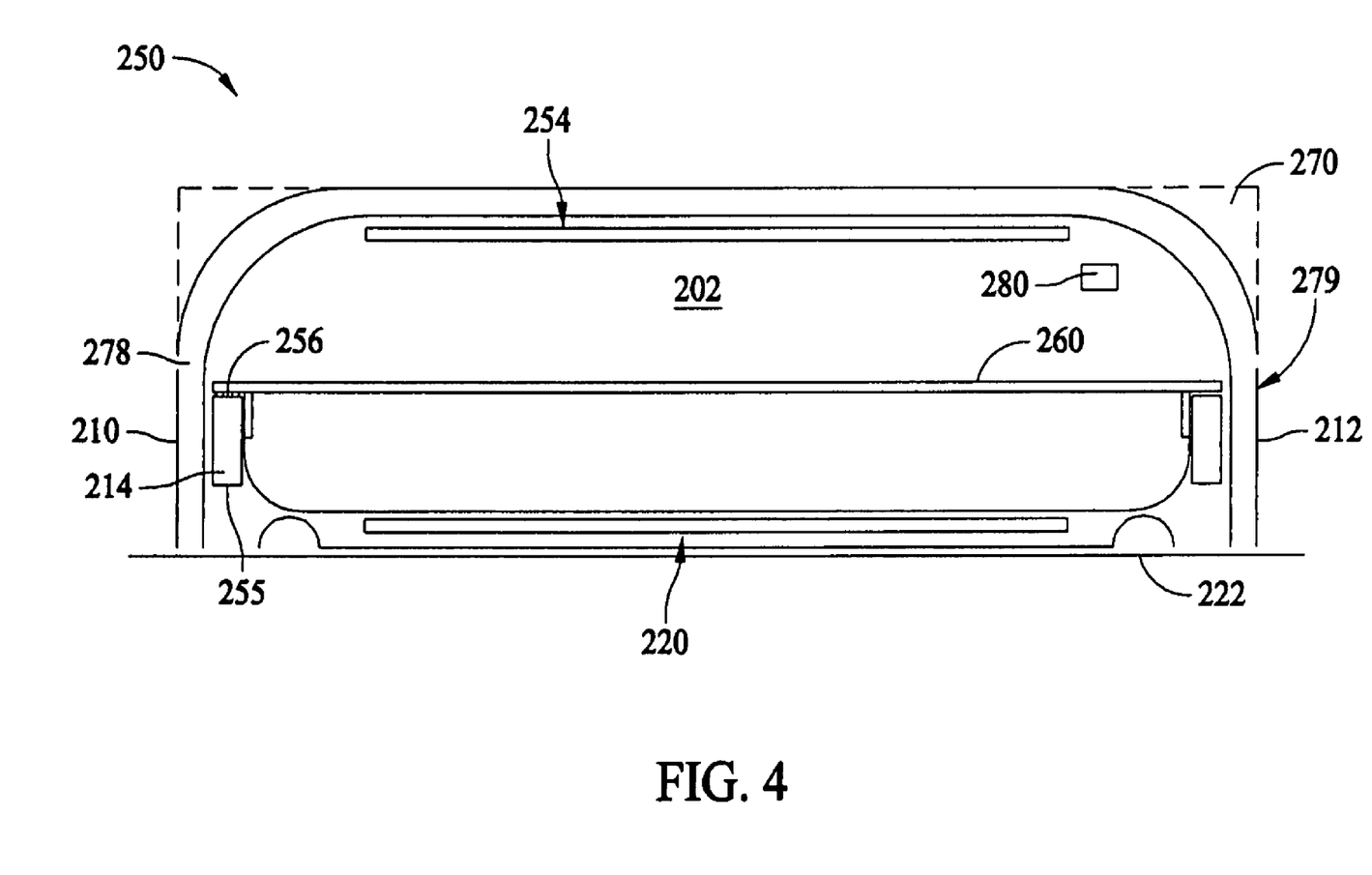
FIG. 4 is a front view of an exemplary cooking platform that can be used with the oven assembly shown in FIG. 1.

As shown in FIG. 4, a drawer frame 255 is positioned within second oven cavity 202, as shown in FIG. 4. Drawer frame 255 is slidably coupled to each slide rail 214 by slides 256. Drawer frame 255 is sized to receive a removable drawer 260, which is positionable upon cooking rack 136 within first oven cavity 108 (shown in FIG. 1) to facilitate cleaning drawer 260 utilizing the self-cleaning feature of first oven cavity 108. Therefore, drawer 260 can be cleaned without requiring a self-cleaning feature in second oven cavity 202, thereby reducing design and manufacturing costs.

In the exemplary embodiment, drawer 260 is a one-piece deep drawn style, which permits drawer 260 to be heated to a high temperature without deforming. Drawer 260 is positioned within second oven cavity 202, and has an exterior surface coated with a pyrolitic enamel material. More specifically, food is positionable within drawer 260 and heated to a desired temperature. Drawer 260 retains undesired deposits such as, for example, grease. Drawer 260 can be removed from second oven cavity 202 and placed within first oven cavity 108. The self-cleaning feature of cooking chamber 108 facilitates removal of the undesired deposits formed on drawer 260.

A drawer front 270 is coupled to drawer frame 255, such that drawer 260 can slide out from second oven cavity 202 together with drawer frame 255 by pulling drawer front 270. Second oven cavity 202 also contains a gasket 278 coupled thereto and an insulating material 279 coupled to at least a portion of oven liner 204 defining second oven cavity 202. When drawer 260 slides into second oven cavity 202, gasket 278 is in sealing contact with oven liner 204 and drawer front 270 to facilitate retaining heat within second oven cavity 202.

A temperature sensor, such as an air temperature sensor and/or a contact temperature sensor, is positioned within second oven cavity 202 to sense and/or monitor a temperature within second oven cavity 202. In one embodiment, a contact temperature sensor 280 is coupled to oven liner 204 for sensing a temperature within second oven cavity 202. In a particular embodiment, contact temperature sensor 280 is coupled to a reflector (not shown) for detecting the temperature thereof. In an alternative embodiment, an air temperature sensor is at least partially positioned within second oven cavity 202 for sensing an air temperature therein.

As shown in FIG. 4, drawer 260 is a one-piece deep drawn style. In alternative embodiments, drawer 260 includes a removable portion, such as a removable bottom portion. In such embodiments, only the bottom portion is removed from second oven cavity 202 to facilitate cleaning the removable bottom portion.

Figure 5:
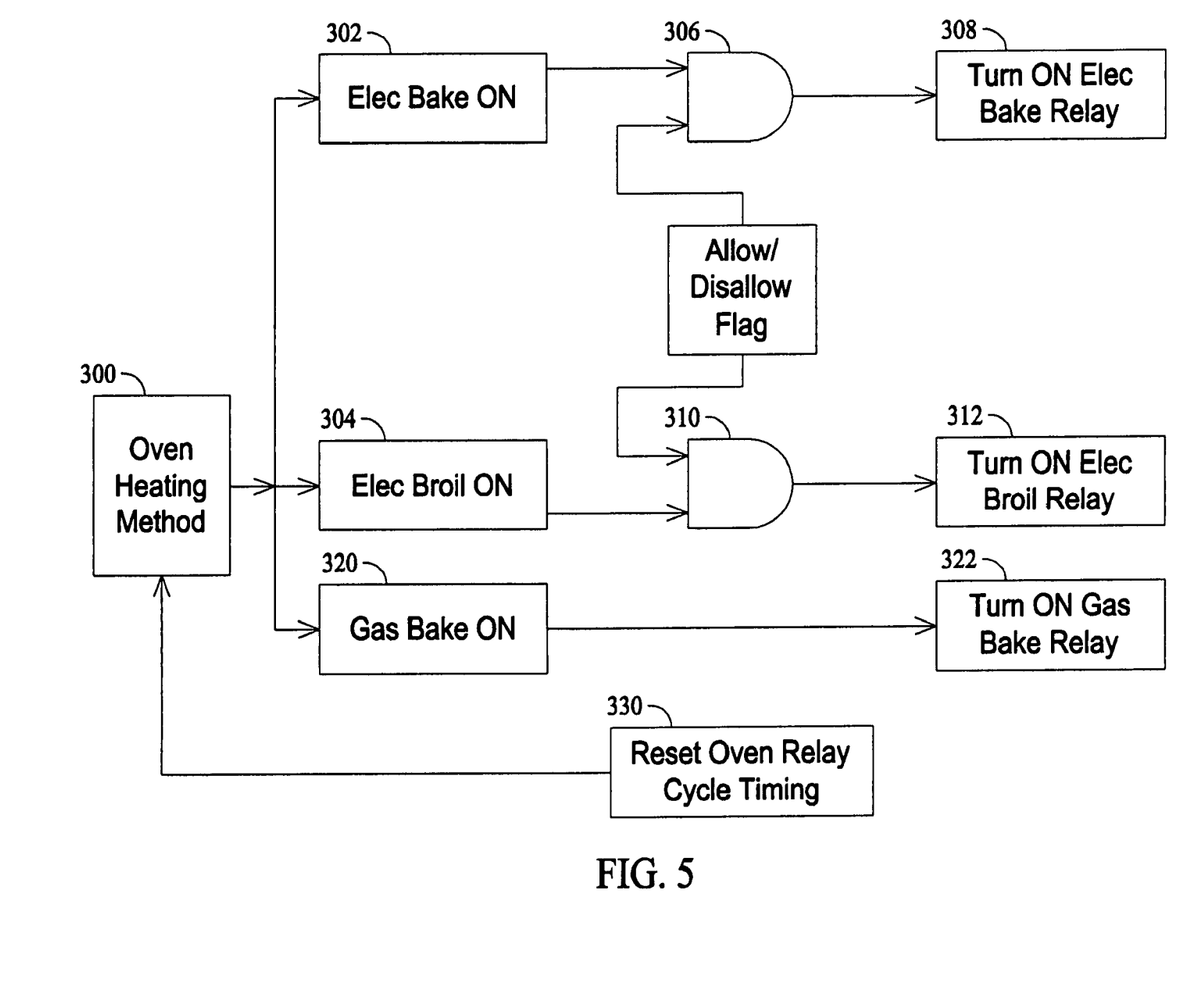
FIG. 5 shows a flow chart of an exemplary oven heating method that can be used with the oven assembly shown in FIG. 1.

FIG. 5 is a flow chart of an exemplary oven heating method 300 suitable for use with oven assembly 10 shown in FIG. 1. Oven heating method 300 interacts with a drawer power sharing program (shown in FIGS. 6A and 6B), and is used to heat oven platform 100 and/or warming platform 200, as shown in FIG. 1. It is understood, however, that the methodology described below can be implemented in any suitable software scheme known to those skilled in the art and guided by the teachings herein provided.

In the exemplary embodiment, controller 150 (shown in FIG. 1) is operatively coupled to a plurality of electrical heating elements and gas burners, such as for example, electrical heating elements 120, 122 (shown in FIG. 1) and gas bake burner 142 (shown in FIG. 1). Controller 150 is also operatively coupled to electrical circuit 144 (shown in FIG. 1) for cycling the selected electrical heating elements on and off.

Controller 150 is operatively coupled to first temperature sensor 124 for detecting a temperature within first oven cavity 108. Controller 150 then determines whether one or both of electrical heating elements 120, 122 need to be cycled on or off. In one embodiment, controller 150 compares the detected temperature with a first bake/broil temperature predetermined or inputted by a user. When the detected temperature is below the first temperature, a signal is sent to corresponding heating element 120 and/or 122 to energize the element and turn it on 302, 304.

In one embodiment, in a baking cycle, upon receiving a signal 302 to energize bake heating element 120, controller 150 determines 306 the state of an allow/disallow flag. If the allow/disallow flag is "allow" then controller 150 cycles 308 bake element 120 on, if the allow/disallow flag is "disallow" then controller 150 maintains bake element 120 in a de-energized state. The allow/disallow flag is set by the drawer power sharing program described in detail below. In the broiling cycle, upon receiving a signal 304 to energize broil heating element 122, controller 150 operates broil element 122 in a similar way. Controller 150 determines 310 the state of the allow/disallow flag, and cycles 312 broil element 122 on when the allow/disallow flag is "allow". As such, controller 150 energizes one of heating elements 120, 122 upon receiving a signal to cycle on and when the flag is "allow".

In one embodiment, controller 150 also energizes gas bake burner 142 in the baking cycle. When the detected temperature is lower than a second desired bake temperature, a signal for cycling gas bake burner 142 on is generated 320. In a particular embodiment, gas bake burner 142 cooperates with bake heating element 120 in the baking cycle when the second temperature is below the first bake temperature. In an alternative embodiment, gas bake burner 142 works independently from bake heating element 120, and the second temperature is independent from the first bake temperature. In a further alterative embodiment, gas bake burner 142 is utilized to preheat first oven cavity 108 and is cycled off after the preheating process.

Upon receiving signal 320 to cycle gas bake burner 142 on, controller 150 channels and ignites 322 gas within gas bake burner 142. As such, gas bake burner 142 works independently from the state of the allow/disallow flag. In an alternative embodiment, an upper gas burner is also provided and operated in a similar manner.

In the exemplary embodiment, controller 150 utilizes an oven relay cycle timer to control the time period for cycling on electrical heating elements 120 and/or 122 and/or gas bake burner 142. The oven relay cycle timer is configured to be reset 330 by the drawer power sharing program.

Figure 6A:
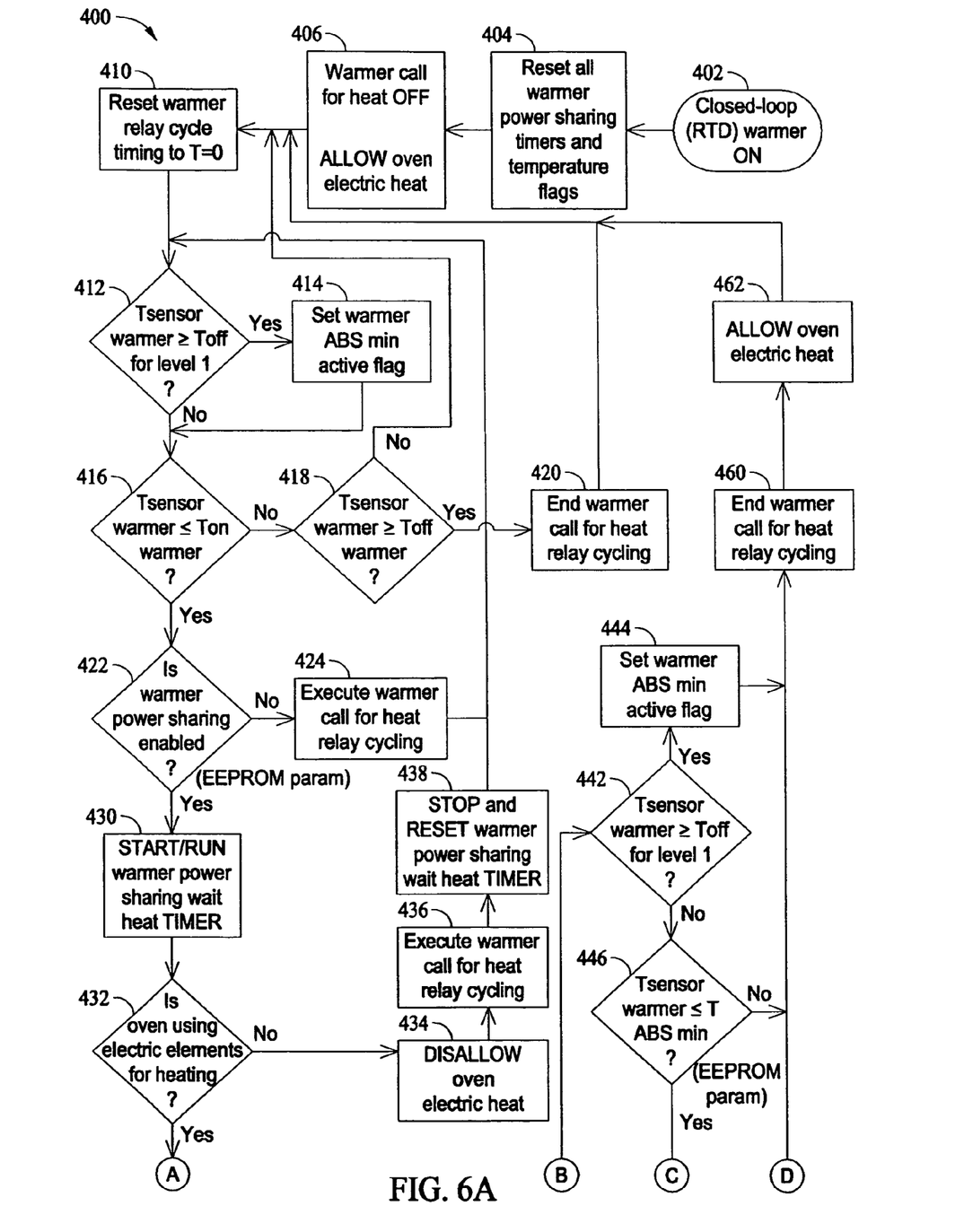
FIGS. 6A and 6B show a flow chart of an exemplary warming drawer power sharing method that can be used with the oven assembly shown in FIG. 1.
Figure 6B:
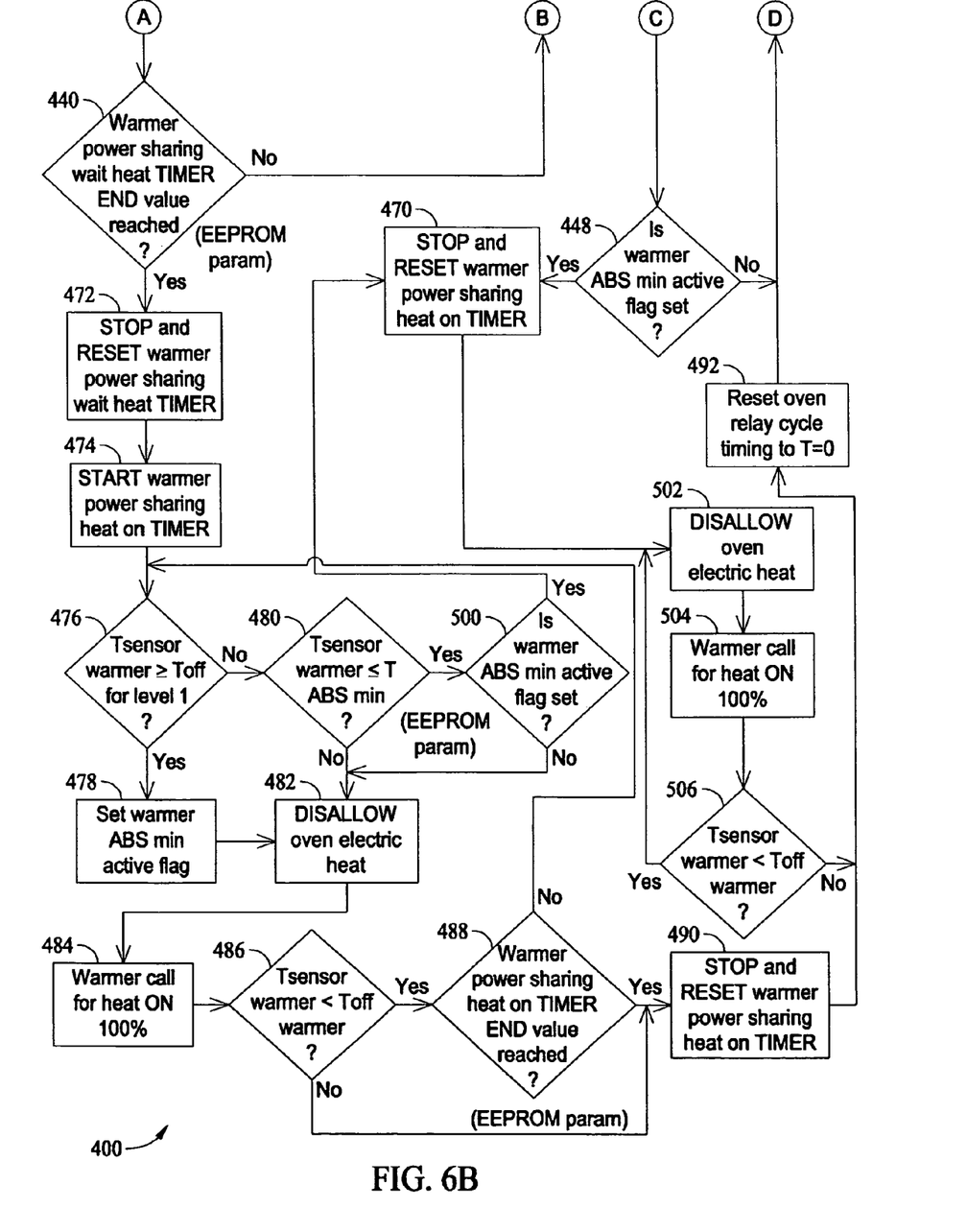

FIGS. 6A and 6B show a flow chart of an exemplary warming drawer power sharing method 400 suitable for use with oven assembly 10 shown in FIG. 1. It is understood, however, that the methodology described below may be implemented in any suitable software scheme known to those skilled in the art and guided by the teachings herein provided.

In the exemplary embodiment, controller 150 is operatively coupled to electrical heating element 220. Controller 150 is operatively coupled to electrical circuit 144 (shown in FIG. 1) for cycling on or off. Controller 150 is also operatively coupled to second temperature sensor 260 for detecting a temperature within second oven cavity 202.

In an exemplary embodiment, warming drawer power sharing method 400 facilitates substantially simultaneously heating cooking platform 100 and warming platform 200 (shown in FIG. 1). Method 400 allows electrical energy to be supplied to the electrical heating element within cooking platform 100 or warming platform 200 at a given time. In this embodiment, only one of heating elements 120, 122, and 220 (shown in FIGS. 1 and 2) is energized for heating the corresponding oven cavity 108 or 202 (shown in FIGS. 1 and 2) at a given time.

As used herein to describe FIGS. 6A and 6B, $T_{sensor\ warmer}$ is defined as a detected temperature of second oven cavity 202 received from second temperature sensor 260, $T_{on\ warmer}$ is defined as a desired temperature for cycling on heating element 220, and $T_{off\ warmer}$ is defined as a desired temperature for cycling off heating element 220. In an exemplary embodiment, warming platform 200 is operated in one of a plurality of selected warming levels, such as for example warming level 1, warming level 2 or warming level 3. Each warming level has a corresponding $T_{on\ warmer}$ and $T_{off\ warmer}$, and $T_{on\ warmer}$ and $T_{off\ warmer}$ increases from warming level 1 to warming level 3. As such, the user may select one of the warming levels to warm second oven cavity 202 to a corresponding temperature. $T_{ABS\ min}$ is defined as a desired minimum temperature to be maintained in second oven cavity 202. In a particular exemplary embodiment, $T_{ABS\ min}$ is lower than $T_{on\ warmer}$, and is approximately 140° F. for keeping food within second oven cavity 202 warm.

In one embodiment, at least some of the above temperatures are predetermined in the program, and may be selected by the user according to different warming levels. In another embodiment, at least some of the above temperatures are input by the user through the user interface input. In still another embodiment, at least one of the above temperatures is input by the user, and the remaining temperatures are determined based on the inputted temperature.

Method 400 in an exemplary embodiment is utilized in loop 402, and is started when the user selects the drawer warming feature through the user interface input. In an exemplary embodiment, a "Warmer ON" flag is shown on the display (not shown) of control panel 132 (shown in FIG. 1) when loop 402 is running.

Upon loop 402 starting, all timers and temperature flags of power sharing method 400 are reset 404 to an initial state. Specifically, a warmer relay cycle timer, a power sharing wait heat timer, and a power sharing heat on timer are reset to zero, and an ABS min active flag is reset to "false". A warmer call for heat is set 406 to "off" if it is already on, and the allow/disallow flag is set to "allow".

After resetting 404, 406 all timer and flags, the warmer relay cycle timer is set 410 to zero, and controller 150 determines 412 whether $T_{sensor\ warmer} \geq T_{off\ warmer}$ for level 1. If $T_{sensor\ warmer} \geq T_{off\ warmer}$ for level 1, controller 150 sets 414 the warmer ABS min active flag to "true". As such, controller 150 determines whether $T_{sensor\ warmer}$ reaches $T_{off\ warmer}$ for warming level 1 at least once before activating the minimum temperature feature.

Controller 150 then determines 416 whether $T_{sensor\ warmer} \leq T_{on\ warmer}$. If $T_{sensor\ warmer} > T_{on\ warmer}$, controller 150 determines 418 whether $T_{sensor\ warmer} \geq T_{off\ warmer}$. If $T_{sensor\ warmer} \geq T_{off\ warmer}$, then controller 150 de-energizes 420 heating element 220 if it is already energized, and returns to step 410. If $T_{sensor\ warmer} < T_{off\ warmer}$, controller 150 also returns to step 410.

If $T_{sensor\ warmer} \leq T_{on\ warmer}$, controller 150 determines 422 whether the warmer power sharing function is enabled. If the power sharing function is disabled, then controller 150 cycles 424 heating element 220 on, and returns to step 412. If the power sharing function is enabled, controller 150 proceeds to heat second oven cavity 202 in a power sharing mode.

In the power sharing mode, controller 150 starts 430 the wait timer or continues running the wait timer if the wait timer is already started. Controller 150 determines 432 whether heating elements 120, 122 within first oven cavity 108 are cycled on. If heating elements 120, 122 are cycled off, controller 150 sets 434 the allow/disallow flag to "disallow", and generates 436 a call for cycling heating element 220 on. As such, heating elements 120, 122 are maintained in the de-energized states when heating element 220 is cycled on, and may be cycled on once heating element 220 is cycled off. Controller 150 then stops and resets 438 the wait timer, and returns to step 412 for heating second oven cavity 202 until $T_{sensor\ warmer} \geq T_{off\ warmer}$.

If heating elements 120, 122 are cycled on, controller 150 determines 440 whether the wait timer reaches an END value. The END value may be predetermined or inputted by the user through the user interface input. If the END value is not reached, controller 150 determines 442 whether $T_{sensor\ warmer} \geq T_{off\ warmer}$ for level 1. If $T_{sensor\ warmer} \geq T_{off\ warmer}$ for level 1, controller 150 sets 444 the ABS min active flag to "true". If $T_{sensor\ warmer} < T_{off\ warmer}$ for level 1, controller 150 determines 446 whether $T_{sensor\ warmer} \leq T_{ABS\ min}$.

If $T_{sensor\ warmer} \leq T_{ABS\ min}$, controller 150 detects 448 the state of the ABS min active flag. If $T_{sensor\ warmer} > T_{ABS\ min}$ or the ABS min active flag is "false", controller 150 stops 460 the call for energizing heating element 220. Controller 150 then sets 462 the allow/disallow flag to "allow", which may resume heating first oven cavity 108, and returns to step 410. If the ABS min active flag is "true", controller 150 stops and resets 470 the heat on timer, and heats second oven cavity 202 described in detail below.

Therefore, when the wait timer does not reach the END value, controller 150 is configured to maintain heating element 220 de-energized if the ABS min active flag is "false" or $T_{sensor\ warmer} \geq T_{ABS\ min}$. Controller 150 is also configured to heat second oven cavity 202 only when the ABS min active flag is "true" and $T_{sensor\ warmer} \leq T_{ABS\ min}$.

If the wait timer reaches 440 the END value, controller 150 stops and resets 472 the wait timer. Controller 150 then starts 474 the heat on timer, and determines 476 whether $T_{sensor\ warmer} \geq T_{off\ warmer}$ for level 1. If $T_{sensor\ warmer} \geq T_{off\ warmer}$ for level 1, controller 150 then sets 478 the ABS min active flag to "true". If $T_{sensor\ warmer} < T_{off\ warmer}$ for level 1, controller 150 determines 480 whether $T_{sensor\ warmer} \leq T_{ABS\ min}$.

If $T_{sensor\ warmer} > T_{ABS\ min}$, controller 150 sets 482 the allow/disallow flag to "disallow", which de-energizes heating elements 120, 122 within first oven cavity 108. Controller 150 then generates 484 a call for energizing heating element 220 at a full output rate, and repeats steps 476-488 until the timer reaches a temperature equivalent to an END value. As such, controller 150 switches energy output from first oven cavity 108 to second oven cavity 202 for a predetermined time period. Controller 150 also determines 486 whether $T_{sensor\ warmer} < T_{off\ warmer}$, such that controller 150 may stop repeating steps 476-488 when $T_{sensor\ warmer} \geq T_{off\ warmer}$.

When $T_{sensor\ warmer}$ reaches $T_{off\ warmer}$ or the heat on timer reaches 488 the END value, controller 150 stops and resets 490 the heat on timer. Controller 150 then resets 492 the oven relay cycle timer to zero, executes steps 460, 462 described above, and returns to step 410. As such, heating element 120 or 122 may be cycled on once heating element 220 is cycled off.

As described above, controller 150 determines 480 whether $T_{sensor\ warmer} \leq T_{ABS\ min}$. Controller 150 also determines 500 the state of the ABS min active flag after step 480. If $T_{sensor\ warmer} > T_{ABS\ min}$ or the ABS min active flag is "false", controller 150 repeats steps 476-488 to heat second oven cavity 202 at most for the predetermined time period. If $T_{sensor\ warmer} \leq T_{ABS\ min}$ and the ABS min active flag is "true", controller 150 stops and resets 470 the heat on timer.

Upon determining the ABS min active flag is "true" from step 500 or 448, controller 150 executes steps 502-506 to heat second oven cavity 202. In one embodiment, controller 150 sets 502 the allow/disallow flag to "disallow", which de-energizes heating elements 120, 122 within first oven cavity 108. Controller 150 then energizes 504 heating element 220 at the full rate, and repeats steps 502, 504 until $T_{sensor\ warmer}$ reaches 506 $T_{off\ warmer}$. As such, when the ABS min active flag is "true", controller 150 switches energy output from first oven cavity 108 to second oven cavity 202 until $T_{sensor\ warmer}$ reaches a desired turn off temperature. Controller 150 then executes steps 492, 460, 462, and 410, and may resume heating first cooking cavity 108.

Power sharing method 400 exclusively energizes the heating element within one of oven cavities 108, 208 at a given time, which facilitates sharing a single electrical circuit for both oven cavities 108, 208. As such, oven assembly 10 may be used in a home without requiring a 240 volt power supply. In addition, the method provides priority heating to first oven cavity 108, which facilitates realizing an optimal cooking performance in first oven cavity 108. The method gives priority heating to second oven cavity 202 when the second oven cavity temperature is below a minimum desired temperature. As such, second oven cavity 202 is substantially maintained above the minimum desired temperature in the power sharing mode.

While the invention has been described in terms of various specific embodiments, those skilled in the art will recognize that the invention can be practiced with modification within the spirit and scope of the claims.

What is claimed is:

1. A control system for an oven having a first oven cavity and a second oven cavity, the oven including at least one first electrical heating element positioned within the first oven cavity, and a second electrical heating element positioned within the second oven cavity, said control system comprising:
   a first temperature sensor configured to detect a temperature within the first oven cavity;
   a second temperature sensor configured to detect a temperature within the second oven cavity; and
   a controller operatively coupled to said temperature sensors and the heating elements, said controller configured to receive signals from said temperature sensors and energize the first heating element and the second heating element by allowing energy to be supplied to one of the first heating element and second heating element at a given time as a function of sensed temperature.

2. A control system in accordance with claim 1 wherein said controller is configured to detect whether the first heating element is energized when the second cavity temperature is below a first predetermined temperature, and to energize the second heating element if the first heating element is not energized.

3. A control system in accordance with claim 2 wherein said controller is configured to de-energize the first heating element if the second cavity temperature is below a second predetermined temperature lower than the first predetermined temperature.

4. A control system in accordance with claim 3 wherein the second heating element is energized once the first heating element is de-energized.

5. A control system in accordance with claim 2 wherein said controller is configured to maintain the second heating element in the de-energized state if the first heating element is energized and the second cavity temperature is above a second predetermined temperature lower than the first predetermined temperature.

6. A control system in accordance with claim 2 wherein said controller is configured to energize the second heating element for a predetermined time period if the second cavity temperature is below a second predetermined temperature lower than the first predetermined temperature.

7. A control system in accordance with claim 2 wherein said controller is configured to energize the second heating element to heat the second cavity to a third predetermined temperature when the second cavity temperature is below a second predetermined temperature lower than the first predetermined temperature.

8. A control system in accordance with claim 2 wherein said controller is configured to energize the first heating element when the first cavity temperature is below a fourth predetermined temperature and the second heating element is de-energized.

9. An oven having a first cavity and a second cavity, said oven comprising:
   at least one first electrical heating element positioned within the first cavity;
   a first temperature sensor configured to detect a temperature within the first cavity;
   at least one second electrical heating element positioned within the second cavity;
   a second temperature sensor configured to detect a temperature within the second cavity; and
   a controller operatively coupled to said temperature sensors and said heating elements, said controller configured to exclusively energize one of said first heating element and said second heating element at a given time as a function of sensed temperature.

10. An oven in accordance with claim 9 wherein said oven further comprises a drawer slidably received within the second cavity, said drawer configured to store food therein.

11. An oven in accordance with claim 9 wherein said controller is configured to detect whether said first heating element is energized when the second cavity temperature is below a first predetermined temperature and if said first heating element is not energized to energize said second heating element.

12. An oven in accordance with claim 11 wherein said controller is configured to de-energize said first heating element if the second cavity temperature is below a second predetermined temperature lower than the first predetermined temperature.

13. An oven in accordance with claim 11 wherein said controller is configured to maintain said second heating element in a de-energized state if said first heating element is energized and the second cavity temperature is above a second predetermined temperature lower than the first predetermined temperature.

14. An oven in accordance with claim 11 wherein said controller is configured to energize said second heating element for a predetermined time period if the second cavity temperature is below a second predetermined temperature lower than the first predetermined temperature.

15. An oven in accordance with claim 11 wherein said controller is configured to energize said second heating element to heat the second cavity to a third predetermined temperature when the second cavity temperature is below a second predetermined temperature lower than the first predetermined temperature.

16. An oven in accordance with claim 9 wherein said oven is configured to operate on a 15 amp circuit.

17. An oven in accordance with claim 9 wherein said oven further comprises a third heating element positioned within the first cavity, said third heating element configured to utilize gas.

18. An oven in accordance with claim 17 wherein said controller is configured to operate said third heating element independently from the operation of said first heating element and said second heating element.

19. An oven in accordance with claim 17 wherein said oven is configured to operate on a 15 amp circuit.

20. A method for providing an oven having a first cavity and a second cavity, said method comprising:
   positioning a plurality of first electrical heating elements within the first cavity;
   providing a first temperature sensor configured to detect a temperature within the first cavity;
   positioning at least one second electrical heating element within the second cavity;
   providing a second temperature sensor configured to detect a temperature within the second cavity; and
   operatively coupling a controller to the temperature sensors and the heating elements, the controller configured to exclusively energize one of the first heating elements and the second heating element at a given time as a function of sensed temperature.

21. A method in accordance with claim 20 wherein coupling a controller comprises coupling a controller configured to detect whether the first heating elements are energized when the second cavity temperature is below a first predetermined temperature.

22. A method in accordance with claim 21 wherein coupling a controller comprises coupling a controller configured to de-energize the first heating elements when the second cavity temperature is below a second predetermined temperature lower than the first predetermined temperature.

23. A method in accordance with claim 21 wherein coupling a controller comprises coupling a controller configured to maintain the second heating element de-energized if one of the first heating elements is energized and the second cavity temperature is above a second predetermined temperature lower than the first predetermined temperature.

24. A method in accordance with claim 21 wherein coupling a controller comprises coupling a controller configured to energize the second heating element for a predetermined time period if the second cavity temperature is below a second predetermined temperature lower than the first predetermined temperature.

* * * * *